United States Patent [19]

Lee

[11] Patent Number: 5,526,740
[45] Date of Patent: Jun. 18, 1996

[54] MULTI-SCREW PRESS FOR DEWATERING WASTE MATERIALS

[75] Inventor: Chung Y. Lee, Seoul, Rep. of Korea

[73] Assignee: Young Tae Kim, Seoul, Rep. of Korea; a part interest

[21] Appl. No.: 373,071

[22] Filed: Jan. 17, 1995

[51] Int. Cl.⁶ .................... B30B 9/16; B30B 9/18
[52] U.S. Cl. ............... 100/112; 100/117; 100/127; 100/146; 100/148; 134/132; 134/144; 210/332; 210/415
[58] Field of Search .................. 100/112, 117, 100/127, 146, 147, 148; 134/132, 144; 210/332, 414, 415

[56] References Cited

U.S. PATENT DOCUMENTS

| | | | |
|---|---|---|---|
| 2,312,764 | 3/1943 | Lubke | 210/332 |
| 3,470,815 | 10/1969 | Jung | 100/117 |
| 4,615,801 | 10/1986 | Lee | 210/185 |
| 4,755,291 | 7/1988 | Lee | 210/179 |
| 4,844,799 | 7/1989 | Lee | 210/179 |
| 4,976,853 | 12/1990 | Lee | 210/107 |

FOREIGN PATENT DOCUMENTS

| | | | |
|---|---|---|---|
| 435122 | 10/1926 | Germany | 100/117 |
| 774958 | 10/1980 | U.S.S.R. | 100/117 |
| 1692860 | 11/1991 | U.S.S.R. | 100/117 |

*Primary Examiner*—Stephen F. Gerrity
*Attorney, Agent, or Firm*—Jacobson, Price, Holman & Stern

[57] ABSTRACT

A multi-screw press for dewatering waste materials including a plurality of fixed filtering cylinders and a plurality of revolving filtering cylinders connected to the fixed filtering cylinders are installed within a single outer casing, and a plurality of tapered screws are located within the fixed and revolving filtering cylinders. The screws and the revolving filtering cylinders are driven by a single motor, so that the waste materials within the filtering cylinders are pressed by the screws and dewatered. A pressure adjusting device is located on the outlet of the screw press and is hydraulically driven. Any residue adhering to the filtering cylinders can be effectively washed away by the use of spray tubes.

3 Claims, 5 Drawing Sheets

MULTI-SCREW PRESS FOR DEWATERING WASTE MATERIALS

FIELD OF THE INVENTION

The present invention relates to a multi-screw press for dewatering waste materials which are discharged from various factories such as marine product processing factories, food processing factories and the like. Particularly, the present invention relates to a multi-screw press for dewatering waste materials, in which a plurality of multiple screwed presses are installed with certain intervals within a single outer casing, and a plurality of filtering cylinders and the plurality of tapered screws are driven by a single motor, so that waste materials within the filtering cylinders should be pressed by the screws, thereby dewatering the waste materials. Further, a pressure adjusting means which is installed on the outlet of the screw press is driven by a hydraulic means, and therefore, the water content of the sludge can be adjusted. Further, in the process of dewatering the waste materials, the residue materials adhered on the revolving filtering cylinders can be effectively washed, so that a sludge containing the minimum water can be produced.

BACKGROUND OF THE INVENTION

In the conventional dewatering presses which are disclosed in U.S. Pat. Nos. 4,615,801, 4,755,291, 4,844,799 and 4,976,853, a single screw press with a filtering cylinder installed thereon presses and moves the waste materials, so that the dewatering should be carried out through the filtering cylinder. Therefore, in accordance with the waste material discharge amounts of factories, the capacity of the screw press has to be different, and the screw press of the corresponding capacity has to be installed. Therefore, the manufacturing cost is increased, and, in the case where a plurality of screw presses are installed, a large amount of power is consumed. Further, the apparatus occupies much space, and the pressure adjusting valves which are installed on the respective screw presses have to be driven by separate motors. Further, the outer circumference of the filtering cylinder is washed with a pressure water, a pressure air or a high pressure steam, and therefore, the residue waste materials adhered on the outside of the cylinder cannot be effectively cleaned.

SUMMARY OF THE INVENTION

The present invention is intended to overcome the above described disadvantages of the conventional techniques.

Therefore it is the object of the present invention to provide a multi-screw press for dewatering waste materials, in which a plurality of screw presses of the same size, with filtering cylinders installed thereon, are installed within a single outer casing, the plurality of the screw presses are driven by a single motor in dewatering the waste materials, pressure adjusting valves installed on the respective screw presses are driven by a single hydraulic means so as to simultaneously adjust the valves, and two spouting tubes perform reciprocating movements between the filter cylinders to spout pressure water, pressure air or high pressure steam, thereby cleaning the filtering cylinders in an effective manner, and increasing the filter efficiency.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
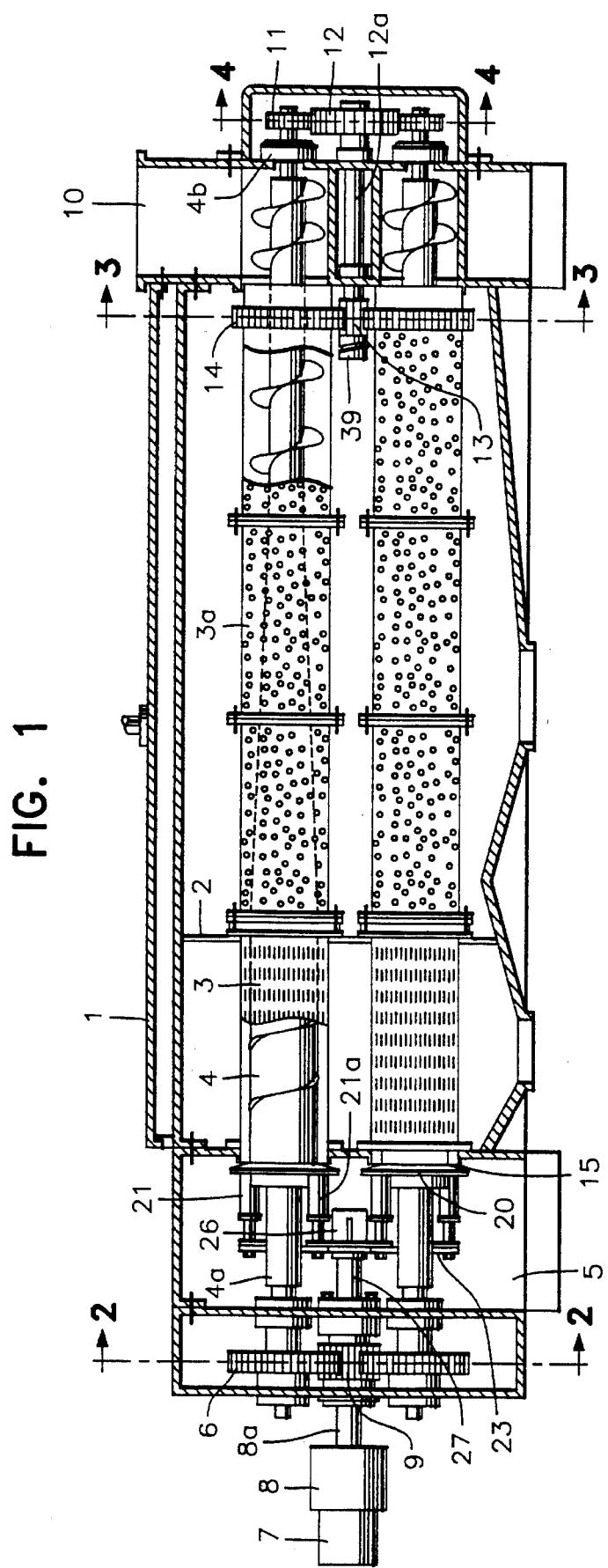
FIG. 1 is a sectional view of the outer casing of the present invention with a part of the filtering cylinders cut out.
Figure 2:
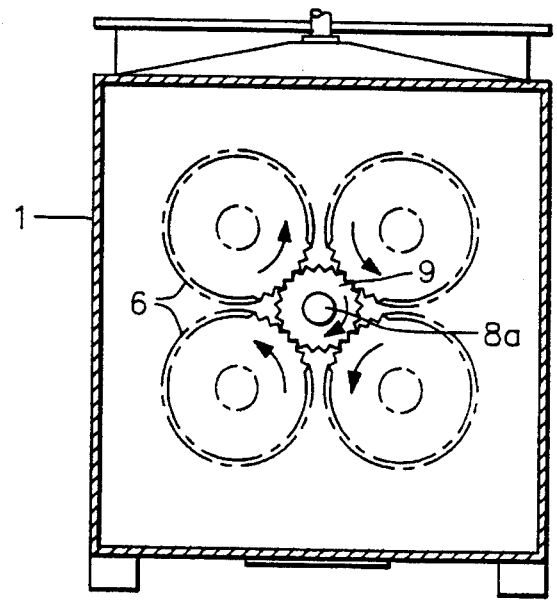
FIG. 2 is a sectional view taken along the line 2—2 of FIG. 1.
Figure 3:
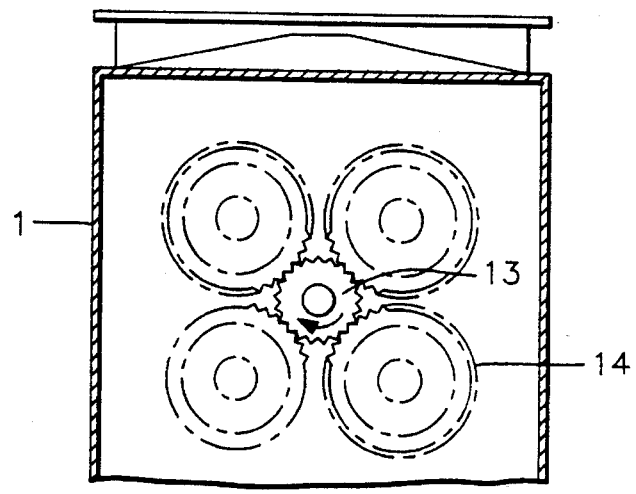
FIG. 3 is a sectional view taken along the line 3—3 of FIG. 1.
Figure 4:
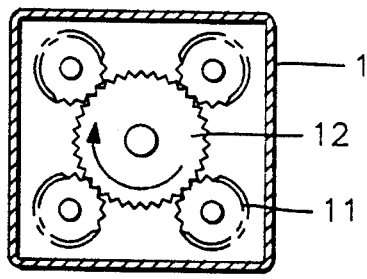
FIG. 4 is a sectional view taken along the line 4—4 of FIG. 1.

A plurality of filtering cylinders 3 are disposed with certain intervals within an outer casing 1, and the filtering cylinders 3 are fixed by means of supporting bars 2, while a plurality of revolving filtering cylinders 3a are rotatably joined with the respective filtering cylinders to form filtering assemblies 3. Within each of the pairs of the filtering cylinder 3 and the revolving filtering cylinder 3a, there is installed a tapered pushing screw 4. A revolution shaft 4a which is connected to one end of the screw 4 is installed across a sludge discharge vessel 5. A large gear or first gear 6 is fixedly installed on the end of the revolution shaft 4a, and the large gear 6 is meshed with a first pinion 9, while the pinion 9 is fixedly installed on a revolution shaft 8a which is connected through a reduction device 8 to a motor 7.

On the side of an inlet 10 of the screw 4, there is disposed a second revolution shaft 4b on which a pinion 11 is fixedly installed. The pinion 11 is meshed with a large gear or second gear 12 which is installed at the center, and which is fixedly installed on a revolution shaft 12a. At the other end of the revolution shaft 12a, there is fixedly installed a third pinion 13 which is meshed with a large gear 14 which is formed on the circumference of the revolving filtering gear 3a. At the side of a discharge hole 15 of the fixed filtering cylinder 3, there is installed a pressure adjusting valve 20 which is fitted on the pushing screw 4. There are as many pressure adjusting valves 20 as the number of the pushing screws 4, and, at the side of each of the pressure adjusting valves 20, there are disposed two connecting cylinders 21 and 21a. Within each of the connecting cylinders 21 and 21a, there is installed a spring 22 which is supported by a piston 25 or 25a. The other ends of the pistons 25 and 25a are fixedly connected to connecting pieces 24 which are fixedly secured to a cross shaped actuation piece 23. At the middle of the four pressure adjusting valves 20, i.e., at the center of the cross shaped actuation piece 23, there is installed a central cylinder 26 into which a reciprocating piston 28 is installed. The other end of the piston 28 is fixedly secured on an outer wall 5a of the sludge discharge vessel 5.

Between the fixed filtering cylinders/revolving filtering cylinders, there are installed spouting or spray tubes 31 and 31a on which large amounts of spouting or spray holes 30 and 30a are formed. The opposite ends of the spouting tubes 31 and 31a are connected with connecting tubes 32 and 32a. One end of the spouting tubes 31 and 31a are secured with supporting tubes 33 and 33a which are movably fitted to pins 34 and 34a which are fixedly secured on a side wall 1a of the outer casing 1. A supporting device 35 which is fixedly connected to the connecting tube 32 is provided with a rectangular hole 36. A pin 38 is movably inserted into the rectangular hole 36, and the pin 38 is secured to a gap adjusting bar 37 which is installed on the other wall 1b of the outer casing 1. A cam groove 39 is formed on the tip of the revolution shaft 12a of the large gear 12 which crosses the inlet 10, and a pin 41 of a drive supporting arm 40 which is fixedly connected to the connecting tube 32a is inserted into the cam groove 39. Thus when the revolution shaft 12a is rotated, the pin 41 of the supporting arm 40 moves around the cam groove 39, so that the spouting tubes 31 and 31a should move to left and right.

The apparatus of the present invention constituted as above will now be described as to its operations.

A plurality of the fixed filtering cylinders 3 are supported to the outer casing by means of supporting bars 2, and a plurality of the revolving filtering cylinders 3a are rotatably joined to the fixed filtering cylinders 3. In each of the pairs of the fixed/revolving cylinders, there is installed a tapered pushing screw 4. The revolution shaft 4a is installed across the sludge discharge vessel 5, and the large gear 6 is fixedly installed on the end of the revolution shaft 4a. The large gear 6 is meshed with the pinion 9 which is installed on the revolution shaft 8a which is connected through the reduction device 8 to the motor 7.

Therefore if the motor 7 is driven, the revolution speed of the motor 7 is reduced through the reduction device 8 to rotate slowly the pinion 9. Then the large gear 6 which is meshed with the pinion 9 and which is fixed to the revolution shaft 4a of the pushing screw 4 is made to revolve slowly. Consequently, the pushing screw 4 is made to revolve slowly, so that the waste materials injected into the inlet 10 should be carried by the pushing screws 4. Then the dewatering and filtering occur in the revolving filtering cylinders 3a and the fixed filtering cylinders 3. The sludge (waste materials) is carried and more and more compressed before being discharged into the discharge vessel 5. When the respective pushing screws 4 revolve, the pinion 11 which is installed on the revolution shaft 4b on the side of the inlet 10 is rotated, so that the large gear 12 which is meshed with the pinion 11 should revolve. When the large gear 12 revolves, the pinion 13 which is installed on the revolution shaft of the large gear 12 revolves, with the result that the large gear 14 formed on the circumference of the revolving filtering gear 3a revolves. Therefore, the revolving filtering cylinder 3a is very slowly rotated by the large gear 14, so that the filtering and dewatering should be done in an efficient manner.

Under this condition, in order to reduce the water content to an extremely low level, the pressure adjusting valves 20 have to be simultaneously adjusted, and the method is as follows.

Figure 5:
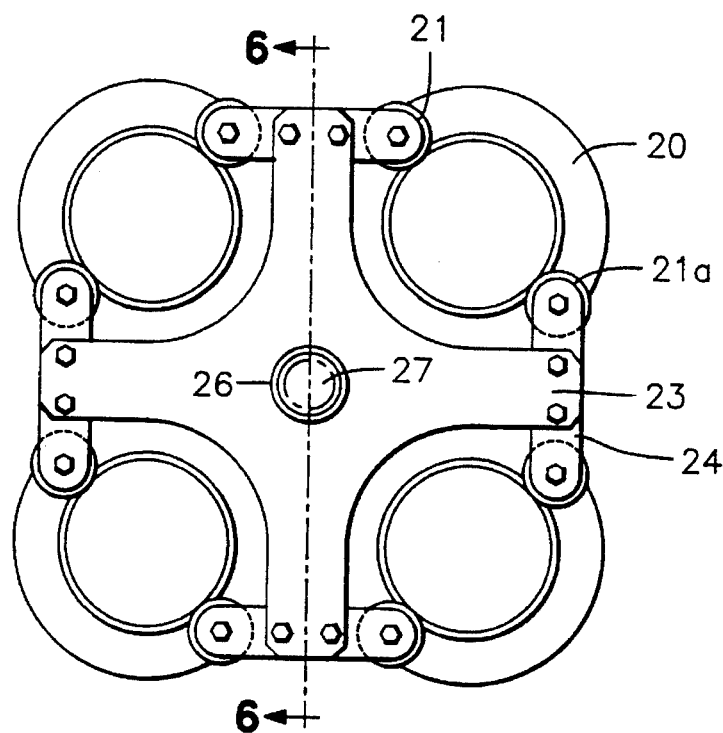
FIG. 5 is an enlarged view of the pressure adjusting valve according to the present invention.

That is, as shown in FIG. 5, the respective pressure adjusting valves 20, which are installed on the ends of the pushing screws 4 at the side of the outlets 15 of the fixed filtering cylinders 3, are provided with connecting cylinders 21 and 21a in contact with the pressure adjusting valves 20. A coil spring 22 is installed within each of the connecting cylinders 21 and 21a, and a piston 25 or 25a is elastically installed against the spring 22, while the pistons 25 and 25a are fixedly connected to connecting pieces 24 which are fixedly connected to a cross shaped actuation piece 23. Further, a cylinder 26 is fixedly installed at the center of the cross shaped actuation piece 23, and a reciprocating piston 28 is inserted into the cylinder 26, while the other side of the piston 28 is connected to a hydraulic device 27 which is fixedly installed on the outside wall of the sludge discharge vessel 5.

Figure 6:
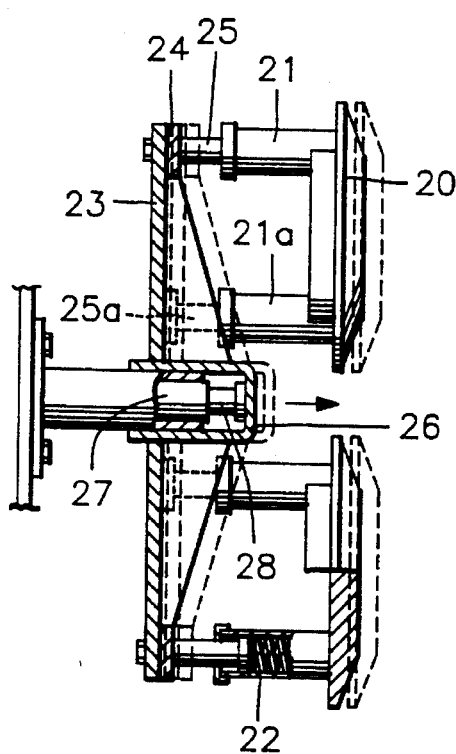
FIG. 6 is a sectional view taken along the 6—6 of FIG. 5.
Figure 7:
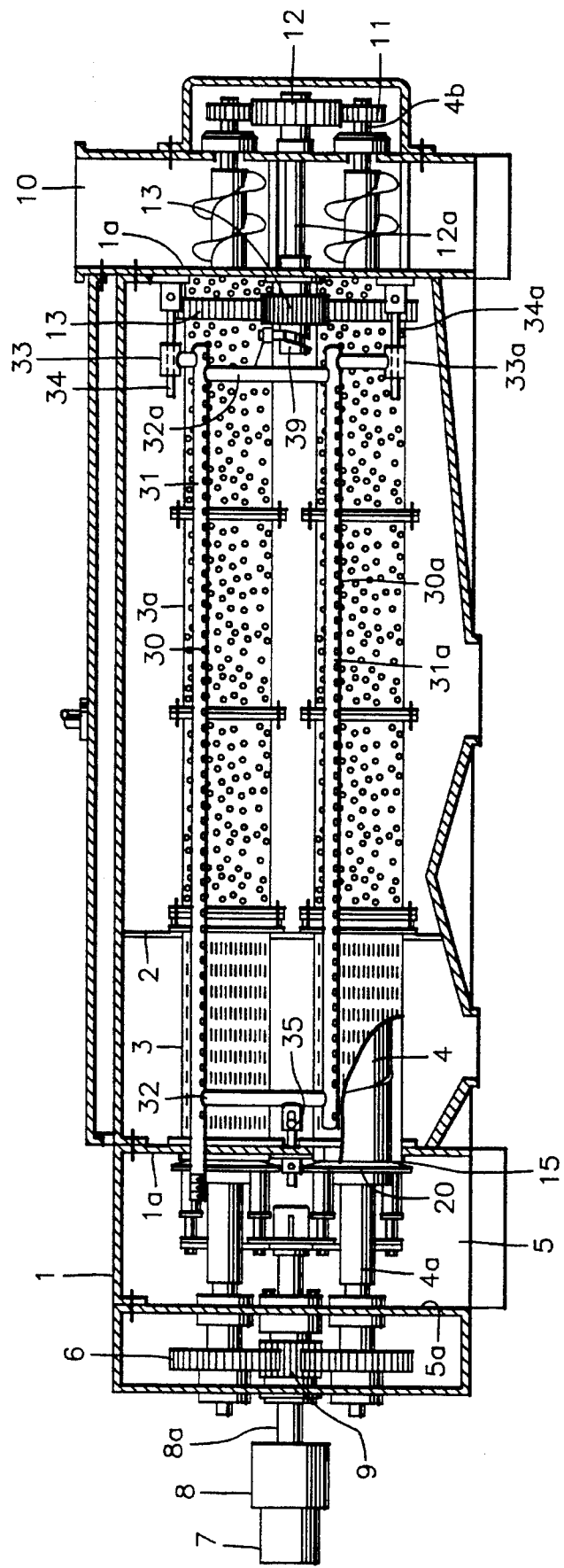
FIG. 7 is a sectional view showing the filtering cylinder of the present invention with a part of it cut out.
Figure 8:
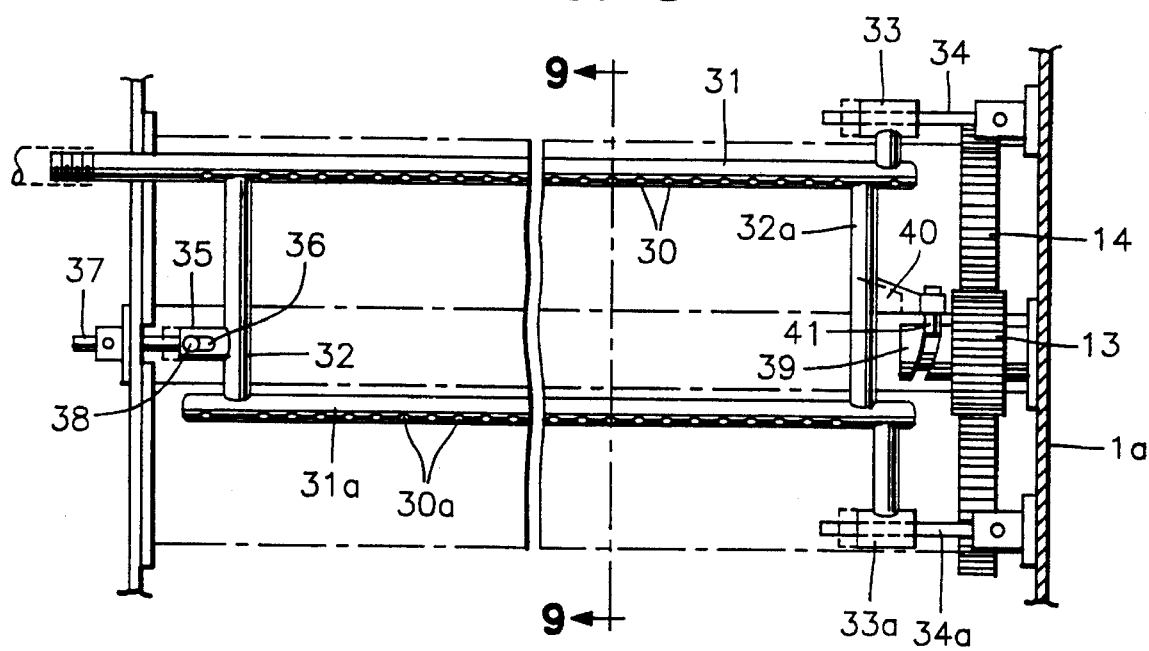
FIG. 8 illustrates the operating state of the critical portion of the present invention.
Figure 9:
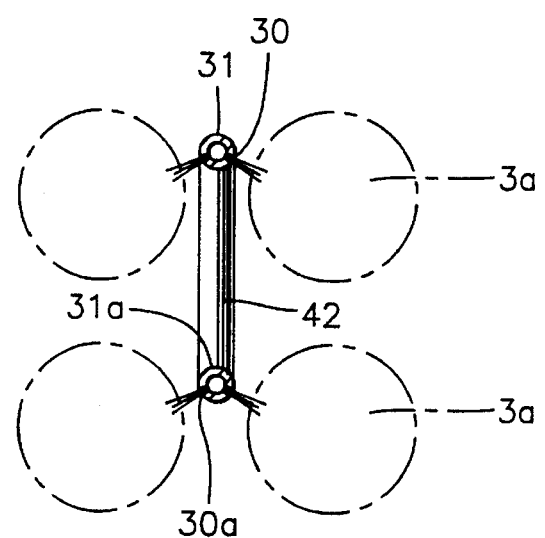
FIG. 9 is a sectional view taken along the line 9—9 of FIG. 8.

If the water content level of the sludge which is discharged through outlet 15 is to be reduced, the hydraulic pressure of the hydraulic device 27 is stepped up, so that the reciprocating piston 28 should be pushed out by the hydraulic device 27, and that the piston 28 should push out the cylinder 26 in the direction of the arrow mark as shown in FIG. 6. Under this condition, when the cross shaped actuation piece 23 on which the cylinder 26 is attached moves, the connecting pieces 24 which are attached to the tips of the cross shaped actuation piece 23 also move. Therefore, the pistons 25 and 25a which are connected to the connecting pieces 24 compress the coil springs 22 of the connecting cylinders 21 and 21a, and at the same time, push the connecting cylinders 21 and 21a, thereby moving the pressure adjusting valves 20. Consequently, the opening of the outlet 15 is reduced, with the result that the water content of the sludge is lowered.

On the other hand, if the load is too high because the discharge pressure for the sludge is too high, and so, if the pressure is to be lowered, then the hydraulic pressure of the hydraulic device 27 is lowered, so that the outlet 15 should be opened more owing to the discharging pressure of the sludge. Therefore, the discharging pressure of the sludge is lowered, and therefore, the overload is dissipated, so that any disorder caused by the overload can be avoided. Thus the life expectancy of the apparatus is extended, and the adjustments of the pressure for the screw presses can be simultaneously carried out. Thus the waste materials can be filtered in an efficient manner.

Meanwhile, in the process of the waste material treatment, residue waste materials adhere on the fixed filtering cylinders 3 and on the revolving filtering cylinders 3a.

Such adhered residue waste materials can be washed off, thereby improving the filtering and dewatering efficiency. In order to efficiently wash the filtering cylinders 3 and 3a, spouting tubes 31 and 31a are installed between the filtering cylinders, and the spouting tubes 31 and 31a are provided with a plurality of spouting holes 30 and 30a. Further, the spouting tubes 31 and 31a are connected by means of connecting tubes 32 and 32a at the opposite ends thereof. Further, supporting tubes 33 and 33a are fixedly installed on the one ends of the spouting tubes 31 and 31a, and the supporting tubes 33 and 33a are movably fitted to pins 34 and 34a which are attached on the side wall 1a of the outer casing. A pin 38 is movably inserted into a rectangular hole 36 which is formed on a supporting device 35 which is attached on the connecting tube 32, and the other end of the pin 38 is fixedly connected to a gap adjusting bar 37 which is installed on the side wall 1b of the outer casing. A cam grooves 39 is formed on the end portion of the revolution shaft 12a (which is installed across the inlet 10) of the large gear 12, and a pin 41 is inserted into the cam groove 39, while the other end of the pin 41 is fitted to a supporting arm 4a of the connecting tube 32a. Thus the cam groove 39 revolves in accordance with the revolutions of the revolution shaft 12a, and therefore, the pin 41 which is installed on the supporting arm 40 moves to left and right along the cam groove 39. Accordingly, the spouting tubes 31 and 31a which are connected and are communicated to the connecting tube 32 also move to left and right. Further, the pin 38 which is fixed to the gap adjusting bar 37 (which is installed on the side wall 1b of the pouter casing 1) is movably inserted into the rectangular hole 36 which is formed on the supporting device 35 which is fixed to the connecting tube 32. Therefore, the spouting tubes 31 and 31a perform reciprocating movements in parallel with each other between the filtering cylinders.

A pressure water, a pressure air or a high pressure steam is supplied to the spouting tubes 31 and 31a which perform reciprocating movements in parallel with each other. Then the pressure water or the like is spouted through the spouting holes 30 and 30a to the filtering cylinders 3 and 3a, so that the residue waste materials adhering on the revolving filtering cylinders 3a should be completely washed off.

Therefore, the filtering and dewatering are carried out in the filtering cylinders 3 and 3a, and therefore, the water content level of the sludge which are pushed and discharge by the screw presses becomes extremely low.

According to the present invention as describe above, the sludge discharge pressure can be arbitrarily adjusted, the filtering cylinders can be cleanly washed, and the plurality of the screw presses and the plurality of the revolving filtering cylinders are driven by a single motor. Therefore, a large quantity of waste materials can be treated with a small power. Further, the screw presses may be manufactured always in the same size, and the facility can be expanded in a convenient manner by adding the screw presses in accordance with the amount of the waste materials to be treated.

What is claimed is:

1. A multi-screw press for dewatering waste materials, comprising:

a plurality of fixed filtering cylinders and a plurality of revolving filtering cylinders installed within an outer casing, each revolving cylinder being connected to one end of a fixed cylinder to form a filtering assembly having a waste inlet end and a waste outlet end;

a plurality of tapered pushing screws installed respectively through said fixed and revolving filtering cylinders;

a first gear fixedly installed on one end of a revolution shaft of each pushing screw for rotating the pushing screw;

a first pinion meshed with said first gears and fixedly installed on a revolution shaft of a reduction device, said reduction device being connected to a motor;

a second pinion fixedly installed on an opposite end of the revolution shaft of each pushing screw, the second pinions being meshed with a second gear having a revolution shaft;

a third pinion fixedly installed on the revolution shaft of said second gear;

a third gear on each of said revolving filtering cylinders and meshed with said third pinion, for thereby rotating said revolving filtering cylinders;

a pressure adjusting valve fitted to each tapered pushing screw at the waste outlet end of each filtering assembly for adjusting discharge pressure of waste;

an actuation piece connected to a reciprocating pressure piston, said piston being connected to a pressure device to adjust said pressure adjusting valves;

spray tubes longitudinally reciprocably installed between said filtering assemblies;

a cam groove formed on said revolution shaft of said second gear 12; and a drive pin inserted into said cam groove and connected to said spray tubes, whereby said spray tubes more reciprocally to wash said filtering assemblies responsive to rotation of the revolution shaft of the second gear.

2. The multi-screw press as claimed in claim 1, wherein each of said pressure adjusting valves is connected to a pair of connecting cylinders; a coil spring is inserted into each of the connecting cylinders; further pistons are inserted into said connecting cylinders; said further pistons are each fixed to a connecting piece; said connecting pieces are fixed to said actuation piece; a further cylinder is formed in said actuation piece; and said reciprocating pressure piston is inserted into said further cylinder.

3. The multi-screw press as claimed in claim 1, wherein said spray tubes are connected together by connecting tubes at opposite ends of the spray tubes; a pair of supporting tubes are connected to the one end of said spray tubes; said supporting tubes are movably fitted to pins, said pins being fixed to a side wall of said outer casing; a further pin is movably inserted into a hole formed on a supporting device fixed to one of said connecting tubes; said further pin is fixed to a gap adjusting bar, said gap adjusting bar being installed on a further side wall of said outer casing and said drive pin is fitted into a supporting arm, said supporting arm being fixed on another of said connecting tubes.

* * * * *